United States Patent [19]

Chirinos et al.

[11] Patent Number: 4,934,398

[45] Date of Patent: Jun. 19, 1990

[54] PREPARATON OF HIPR EMULSIONS AND TRANSPORTATION THEREOF

[75] Inventors: Maria L. Chirinos, Caracas, Venezuela; Alistair S. Taylor; Spencer E. Taylor, both of Camberley, England

[73] Assignees: The British Petroleum Company p.l.c., London, United Kingdom; Intevep S.A., Edo. Miranda, Venezuela

[21] Appl. No.: 201,271

[22] Filed: Jun. 2, 1988

Related U.S. Application Data

[63] Continuation of Ser. No. 919,601, Oct. 14, 1986, abandoned, which is a continuation of Ser. No. 700,084, Feb. 11, 1985, abandoned.

[30] Foreign Application Priority Data

Feb. 18, 1984 [GB] United Kingdom ................. 8404347

[51] Int. Cl.$^5$ .......................... B01J 13/00; F17D 1/17

[52] U.S. Cl. ...................................... 137/13; 252/312; 252/314

[58] Field of Search .................... 252/312, 314; 137/13

[56] References Cited

U.S. PATENT DOCUMENTS

| | | | |
|---|---|---|---|
| 2,684,949 | 7/1954 | McMillan et al. | 252/314 |
| 3,067,038 | 12/1962 | O'Connell | 252/312 X |
| 3,425,429 | 2/1969 | Kane | 137/13 |
| 3,565,817 | 2/1971 | Lissant | 252/312 |
| 4,028,426 | 6/1977 | Mansell | 260/652 P |
| 4,155,873 | 5/1979 | Salazar et al. | 252/314 X |
| 4,293,459 | 10/1981 | Detroit | 106/277 X |

FOREIGN PATENT DOCUMENTS

| | | |
|---|---|---|
| 1132908 | 5/1982 | Canada . |
| 1283462 | 7/1972 | United Kingdom . |

*Primary Examiner*—Richard D. Lovering

*Attorney, Agent, or Firm*—Morgan & Finnegan

[57] ABSTRACT

An HIPR (high internal phase ratio) emulsion of oil in water is prepared by directly mixing 70 to 98% by volume of a viscous oil having a viscosity in the range 200 to 250,000 mPa.s at the mixing temperature with 30 to 2% by volume of an aqueous solution of an emulsifying surfactant or an alkali, percentages being expressed as percentages by volume of the total mixture. Mixing is effected under low shear conditions in the range 10 to 1,000 reciprocal seconds in such manner that an emulsion is formed comprising highly distorted oil droplets having mean droplet diameters in the range 2 to 50 micron separated by thin interfacial films.

The emulsions are much less viscous than the oils from which they are prepared and may, optionally after dilution, be pumped through a pipeline.

Viscous crude oils may be transported by this method.

11 Claims, 4 Drawing Sheets

Diluted emulsion 90 per cent HIPR o/w emulsion

25 μm

PREPARATON OF HIPR EMULSIONS AND TRANSPORTATION THEREOF

This is a continuation of copending application Ser. No. 919,601, filed Oct. 14, 1986 and now abandoned, which is a continuation of Ser. No. 700,084, filed Feb. 11,1985 and now abandoned.

This invention relates to a method for the preparation of emulsions of oil in water and more particularly the preparation of high internal phase ratio (HIPR) emulsions of viscous oils in water.

Many crude oils are viscous when produced and are thus difficult, if not impossible, to transport by normal methods from their production location to a refinery.

Several methods have been suggested for the transportation of such crudes by pipeline. These include (1) heating the crude and insulating the pipeline, (2) adding a non-recoverable solvent, (3) adding a recoverable solvent, (4) adding a lighter crude oil, (5) forming an annulus of water around the crude and (6) emulsifying the crude in water.

Methods (1)-(4) can be expensive in terms of added components and capital expenditure and Method (5) is technically difficult to achieve.

Method (6) whilst superficially attractive presents special difficulties. The dispersion of a highly viscous oil in a medium of much lower viscosity is an unfavourable process on hydrodynamic grounds. This problem is further complicated by the economic requirement to transport emulsions containing relatively high oil phase volumes without sacrificing emulsion fluidity. Mechanical dispersion can lead to the formation of polydisperse or multiple emulsions, both of which are less suitable for transportation.

In the case of a system comprising dispersed spheres of equal size, the maximum internal phase volume occupied by a hexagonally close-packed arrangement is ca 74%. In practice, however, emulsions are rarely monodisperse and it is therefore possible to increase the packing density without causing appreciable droplet distortion. Attempts to increase further the internal phase volume results in greater droplet deformation and, because of the larger interfacial area created, instability arises; this culminates in either phase inversion or emulsion breaking. Under exceptional circumstances, it is possible to create dispersions containing as high as 89% disperse phase volume without inversion or breaking.

Emulsified systems containing 70% internal phase are known as HIPR emulsions. HIPR oil-in-water emulsions are normally prepared by dispersing increased amounts of oil into the continuous phase until the internal phase volume exceeds 70%. Clearly, for very high internal phase volumes, the systems cannot contain discrete spherical oil droplets; rather, they will consist of highly distorted oil droplets, separated by thin interfacial aqueous films.

A useful state-of-the-art review of HIPR emulsion technology is given in Canadian Pat. No. 1,132,908.

British patent specification No. 1,283,462 discloses a method for producing an oil-in-water emulsion comprising beating up a mixture of the oil and water together with emulsifying agent in a vessel having a bottom exit to disperse the oil in droplets of an average size of not more than 10 microns in diameter throughout the water to form a concentrated emulsion, continuously withdrawing concentrated emulsion from the bottom exit of the vessel while simultaneously introducing components of the mixture into the top of the vessel to form further concentrated emulsion.

The oils are synthetic polymers or thickened animal or vegetable oils.

The action of the beater results in particle sizes in the dispersed phase of not more than 10 microns in diameter, usually from about 0.5 to 2 microns in diameter. The concentration of surfactant used is relatively high, 4–10% by weight of the total composition.

This results in concentrated, thick, extremely stable emulsions which have thixotropic properties and are useful as vehicles for paints or other coatings.

While 1,283,462 discloses that the concentrated emulsions are discharged through a short conduit from the emulsifying vessel to a tank in which they are further diluted, the concentrated emulsions are not suitable, nor are they intended, for transportation over long distances through relatively large diameter pipelines such as those used for the transportation of crude oil.

Furthermore, because of their extreme stability these emulsions cannot be, and are not intended to be, readily broken. Thus they are unsuitable for applications where it is desired eventually to resolve the emulsions into their constituent parts, such as the treatment of crude oil where water must be removed before fractionation in an oil refinery distillation unit.

We have now discovered a method for the preparation of HIPR emulsions of viscous oils in water in which emulsions are directly prepared from a feedstock initially containing a high volume ratio of oil to water using low energy mixing. Some emulsions are readily pumpable through a pipeline, others are so after dilution. The emulsions or diluted emulsions are of high but not excessive stability. By high but not excessive stability we mean that they are stable following preparation, during transportation and on standing, and can resist various conditions encountered during pipeline flow such as temperature fluctuations and mechanical shearing. However, they can be broken when desired by using an appropriate treatment, for example treatment with an alcohol or a salt.

Thus according of the present invention there is provided a method for the preparation of an HIPR emulsion of oil in water which method comprises directly mixing 70 to 98%, preferably 80 to 90%, by volume of a viscous oil having a viscosity in the range 200 to 250,000 mPa.s at the mixing temperature with 30 to 2%, preferably 20 to 10%, by volume of an aqueous solution of an emulsifying surfactant or an alkali, percentages being expressed as percentages by volume of the total mixture; mixing being effected under low shear conditions in the range 10 to 1,000, preferably 50 to 250 reciprocal seconds in such manner that an emulsion is formed comprising highly distorted oil droplets having mean droplet diameters in the range 2 to 50 micron separated by thin interfacial films.

It is a simple matter to determine by routine tests whether any given surfactant is an emulsifying surfactant within the context of the present invention.

Emulsifying surfactants may be non-ionic, ethoxylated ionic anionic or cationic, but are preferably non-ionic.

Suitable non-ionic surfactants are those whose molecules contain both hydrocarbyl, hydrophobic groups (which may be substituted) having a chain length in the range 8 to 18 carbon atoms, and one or more polyoxyethylene groups containing 9 to 100 ethylene oxide units in total, the hydrophilic group or groups containing 30 or more ethylene oxide units when the hydrophobic group has a chain length of 15 carbon atoms or greater.

Preferred non-ionic surfactants include ethoxylated alkyl phenols, ethoxylated secondary alcohols, ethoxylated amines and ethoxylated sorbitan esters.

Non-ionic surfactants are suitably employed in amount 0.5 to 5% by weight, expressed as a percentage by weight of the aqueous solution.

Insofar as non-ionic and ethoxylated ionic surfactants are concerned, the salinity of the aqueous phase is not material and fresh water, saline water (e.g. sea water) or highly saline water (e.g. petroleum reservoir connate water) may equally be employed.

Suitable cationic surfactants include quaternary ammonium compounds and n-alkyl diamines and triamines in acidic audic form.

They are suitably employed in amount 0.5 to 5% by weight, expressed as above.

Suitable anionic surfactants include alkyl, aryl, and alkyl aryl sulphonates and phosphates.

They are suitably employed in amount 0.5 to 5% by wt, expressed as above.

When alkali is employed it is believed that this reacts with compounds present in the oil to produce surfactants in situ.

Alkali is suitably employed in amount 0.01 to 0.5% by weight, expressed as above.

Ionic surfactants are more sensitive to the salinity of the aqueous phase, particularly to divalent and trivalent ions found in connate water, and fresh water should be used in connection with these materials.

To overcome this problem and improve salt tolerance, hydrophilic polymers may be added in addition to the surfactant or alkali. Suitable polymers include polyvinyl alcohol, polyethylene oxide, polyvinyl pyrrolidone and polysaccharide biopolymers.

When used with a surfactant these polymers may reduce the quantity of non-ionic surfactant required and/or improve the performance of ionic surfactants.

The quantity of polymer employed is preferably in the range 0.25 to 5% by weight of the aqueous solution.

Within the viscosity range 200–2,000 mPa.s, it has been found possible to prepare oil in water emulsions by other means. For a given mixer, towards the lower limit of this range almost identical droplet size distributions and mean droplet sizes are obtained from the present and conventional methods. On the other hand, as the upper limit of this range is approached, a deterioration in quality of conventionally produced emulsions occurs, indicated by an increase in mean droplet diameter and distribution broadening, suggesting that the method according to the present invention is superior.

For oil phase viscosities greater than 2,000 mPa.s up to the limits of dispersibility, say 250,000 mPa.s, we believe that only the present method is suitable.

HIPR emulsions of highly viscous oils in water are frequently as much as three to four orders of magnitude less viscous than the oil itself and consequently are much easier to pump through a pipeline and require considerably less energy to do so.

Usually the droplet size distribution will be in a narrow range, i.e. the emulsions have a high degree of monodispersity.

For a given mixer, the droplet size can be controlled by varying any or all of the three main parameters: mixing intensity, mixing time and surfactant concentration. Increasing any or all of these will decrease the droplet size.

Temperature is not significant except insofar as it affects the viscosity of the oil.

The oil and water may be mixed under conditions known to be suitable for mixing viscous fluids, see H F Irving and R L Saxton, Mixing Theory and Practice (Eds. V W Uhl and J B Gray), Vol 1, Chap 8, Academic Press, 1966. Static mixers are also suitable.

A particularly suitable mixer is a vessel having rotating arms. Suitably the speed of rotation is in the range 500 to 1,200 rpm. Below 500 rpm mixing is relatively ineffective and/or excessive mixing times are required.

Suitable mixing times are in the range 5 seconds to 10 minutes. Similar remarks to those made above in respect of the speed range also apply to the time range.

The HIPR emulsions as prepared are stable and can be diluted with aqueous surfactant solution, fresh water or saline water to produce emulsions of lower oil phase volume showing high degrees of monodispersity. The emulsions may be diluted to a required viscosity without adversely affecting stability. Because the narrow size distribution and droplet size are maintained upon dilution the resulting emulsion shows little tendency to creaming. This in turn reduces the risk of phase separation occurring.

The emulsions, particularly when diluted, are suitable for transportation through a pipeline and represent an elegant solution to the problem of transporting viscous oils.

Thus according to a further aspect of the present invention there is provided a method for the transportation of a viscous oil which method comprises the steps of (a) preparing an HIPR emulsion of the oil-in-water type by a method as hereinbefore described, (b) optionally diluting the HIPR emulsion with an aqueous phase to a desired viscosity and/or concentration, and (c) pumping the HIPR emulsion or the diluted emulsion through a pipeline.

The stability of the emulsions reduces the risk of phase separation occurring in the pipeline which would result in a higher pressure drop and a loss in efficiency.

After pipelining, for example from an inland oilfield to a coastal terminal, it may be desirable to tranship the oil further by tanker. In this case, the emulsion, or even more so, the diluted emulsion, may be partially dehydrated before loading.

Suitable oils for treatment are the viscous, heavy and/or asphaltenic crude oils to be found in Canada, the USA and Venezuela, for example Lake Marguerite crude oil from Alberta, Hewitt crude oil from Oklahoma and Cerro Negro crude oil from the Orinoco oil belt.

Generally the API gravity should be in the range 5° to 20°, although the method can be applied to crude oils outside this API range.

Once transported to a refinery, the heavy crude oil-in-water emulsions must be resolved into their component parts and at this stage, further benefits of the low polydispersity of (diluted) HIPR emulsions may be realised. The lack of sub-micron oil droplets, which are more difficult to resolve and commonly cause effluent problems, may result in a more efficient separation process and a cleaner water phase.

The invention is illustrated with reference to the following Examples and FIGS. 1 to 3 of the accompanying drawings.

BRIEF DESCRIPTION OF THE DRAWINGS

FIG. 3(*a*) representing the emulsion of Example 10 and FIG. 3(*b*) that of Example 17.

EXAMPLES

Lake Marguerite crude oil (LMCO) was used as the oil phase. LMCO is a heavy crude oil (10.3° API, $\eta$=19,800 mPas at 25° C.).

The surfactants used were either commercially available or were samples received from BP Chemicals International or BP Detergents International. 2.5% (wt/wt) surfactant solutions were made up in simulated formation water, see Table 1, except where distilled water is indicated.

Typically, 90% HIPR emulsions were prepared by adding a 90 g sample of LMCO to a 250 ml beaker containing 10 g of 2.5% aqueous surfactant solution. This was then mixed at room temperature (20±2° C.) using a twin-beater hand-held domestic mixer (Moulinex Model No 593) operating for one minute at 1000 rpm (speed setting "1") followed by a further one minute period at 1200 rpm (speed setting "2").

Figure 1:
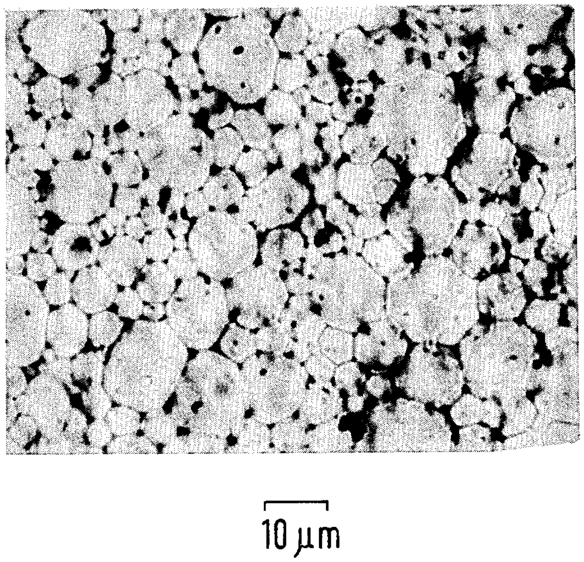
FIG. 1 is a photomicrograph of a typical HIPR (90%) emulsion stabilized by a 2.5% solution of the surfactant used in Example 10.

The morphology of the emulsions resembles well-drained polyhedral foams as shown in the photomicrograph of a typical HIPR (90%)k emulsion stabilized by a 2.5% solution of the surfactant used in Example 10, see FIG. 1.

The appearance of the mixture is indicative of whether aqueous surfactant lamellae (dark-brown colour, creamy texture) or aqueous droplets (lustrous black colour, smooth texture) are formed. In the former case, the product is completely water-dispersible, whereas in the latter, it is not. Emulsions of lower oil content can be produced by dilution of the former emulsion with aqueous surfactant solution, fresh water or saline water as previously stated.

During the mixing process leading to lamellae, incorporated films of aqueous surfactant are stretched out and folded throughout the bulk oil, ultimately leading to the complex film structure depicted in FIG. 1.

Figure 2:
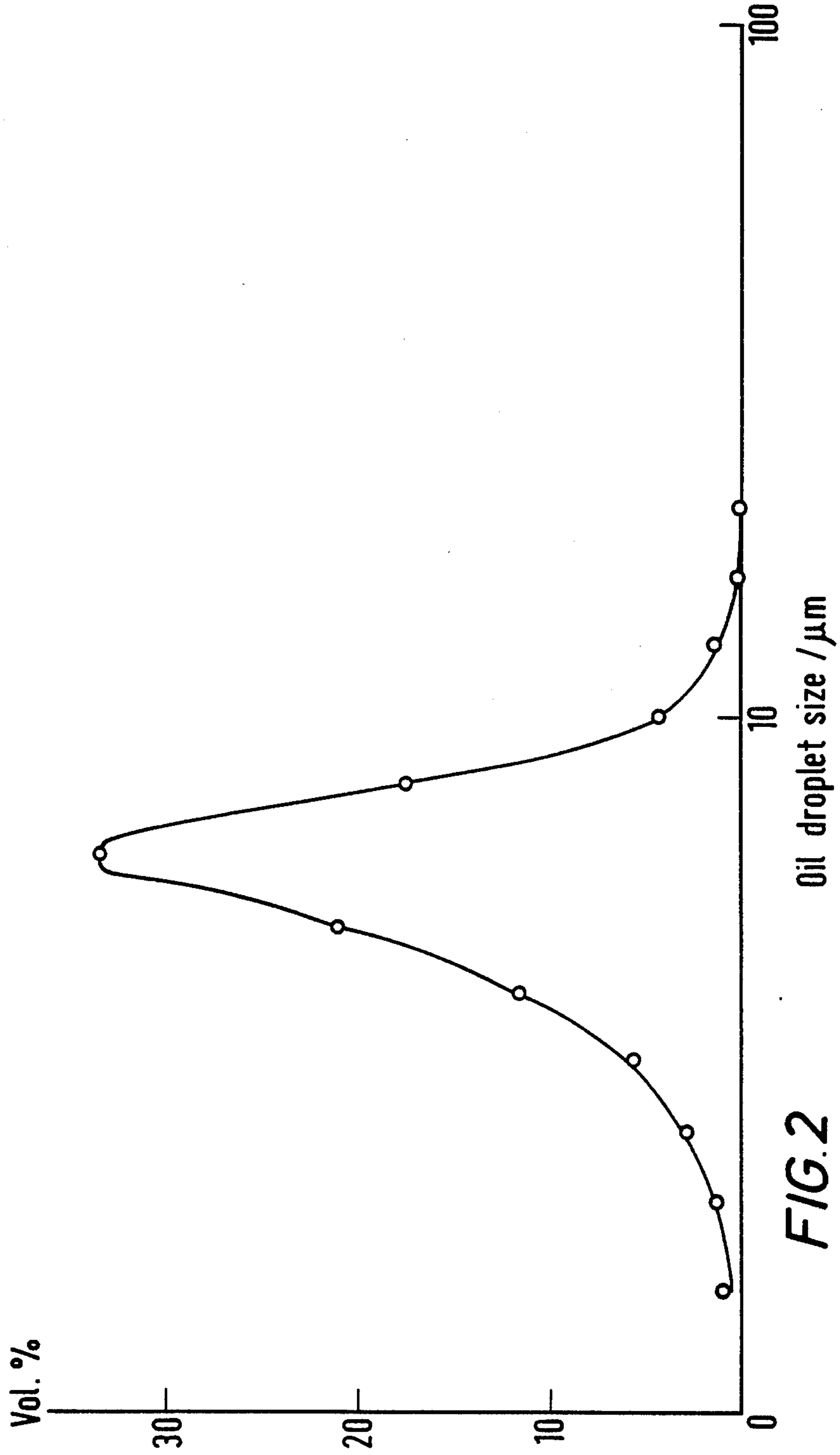
FIG. 2 is a typical droplet size distribution curve.

Droplet size distributions of emulsions prepared in this way were measured using Coulter Counter Analysis (Model TA II, Coulter Electronics, Luton, Beds). A typical droplet size distribution curve is shown in FIG. 2.

Figure 3A:
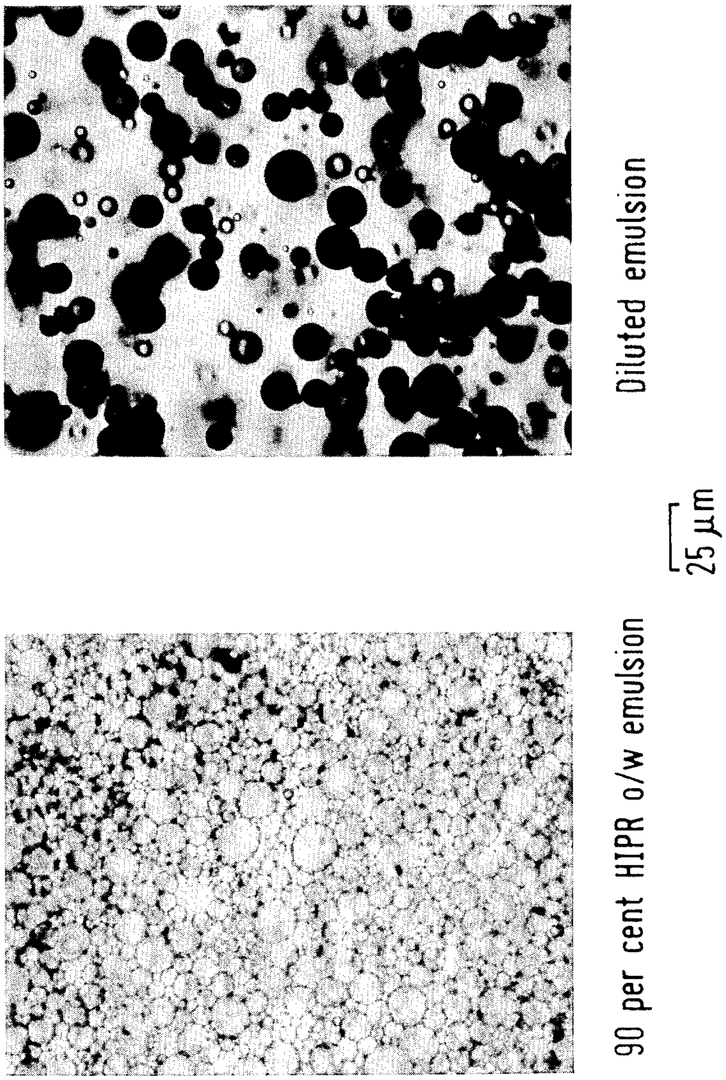
FIG. 3(*a*) and FIG. 3(*b*) are photomicrographs showing the effect of HIPR emulsion with additional water.
Figure 3B:
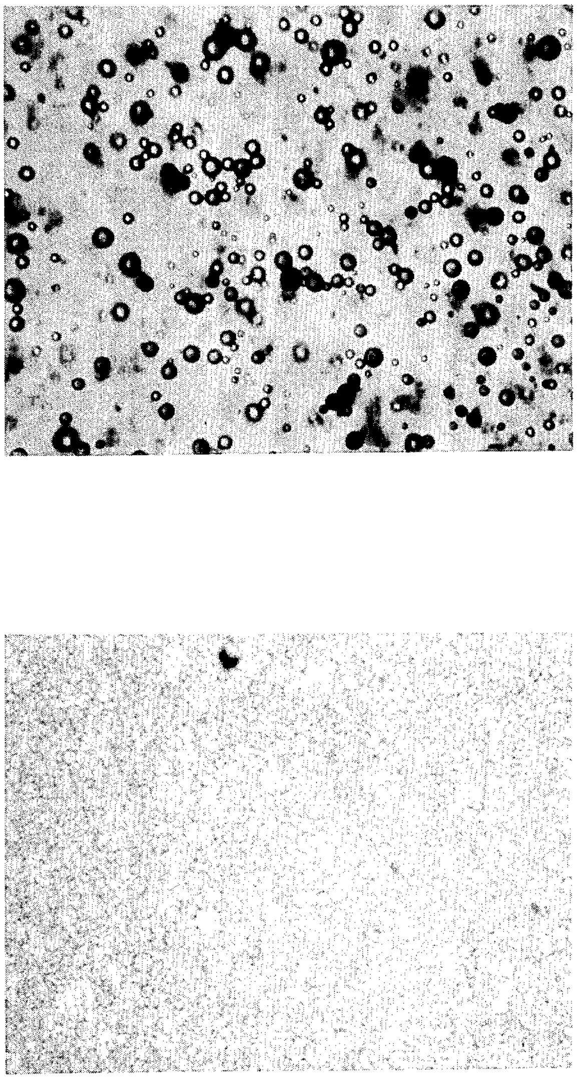

Dilution of the HIPR emulsion with additional water releases the oil from its constraining framework and spherical droplets separate. This effect can be seen from the photomicrographs presented in FIG. 3; the different appearance of the concentrated and dilute emulsions is a consequence of different contrast levels. Also evident from the photomicrographs of the diluted HIPR emulsions shown in FIG. 3 is the monodispersity of the emulsions prepared in this manner. FIG. 3(*a*) represents the emulsion of Example 10 and FIG. 3(*b*) that of Example 17.

Table 2 contains a list and generalised structures of the surfactants used, and their effectiveness as 2.5% solutions based on the water phase in producing HIPR o/w emulsions, except where other concentrations are indicated.

TABLE 1

Composition of Simulated Formation Water Used in the Preparation of LMCO-in-Water Emulsions

| Salt | [salt] (ppm) |
|---|---|
| NaCL | 20,000 |
| KCl | 1,000 |
| $MgCl_2$ | 2,000 |
| $CaCl_2$ | 1,000 |
| $NaHCO_3$ | 500 |

TABLE 2

Surfactants used in the Attempted Preparation of 90% o/w Emulsions

| No | Chemical Type | Longest Carbon Chain in Hydrophobe | Average No of EO Groups/ Molecule | O/W Emulsion Formed | Mean Droplet Diameter (microns) |
|---|---|---|---|---|---|
| 1 | 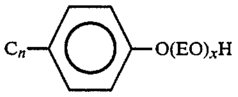  | 13 | 10 | Yes | 9.8 |
| 2 | | | 13 | " | 6.4 |
| 3 | | | 15 | " | 6.0 |
| 4 | | | 20 | " | 6.3 |
| 5 | | | 30 | " | 9.0 |
| 6 | | | 30 | " | 9.0 |
| 7 | | | 100 | " | 15.0 |
| 8 | | 22 | 30 | No | — |
| 9 | 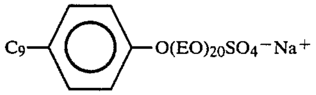  | | 20 | Yes | 7.5 |
| 10 | 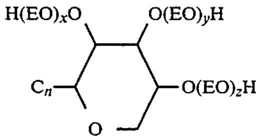  | 12 | 20 | " | 12.0 |
| 11 | | 16 | 20 | No | — |
| 12 | | 18 | 20 | " | — |
| 13 | $C_{11-15}$—CH($CH_3$)—O(EO)$_n$H | 13-17 | 7 | " | — |
| 14 | | | 12 | Yes | 6.6 |
| 15 | | | 20 | " | 7.5 |
| 16 | | | 40 | " | 10.5 |

TABLE 2-continued

Surfactants used in the Attempted Preparation of 90% o/w Emulsions

| No | Chemical Type | Longest Carbon Chain in Hydrophobe | Average No of EO Groups/ Molecule | O/W Emulsion Formed | Mean Droplet Diameter (microns) |
|---|---|---|---|---|---|
| 17 | 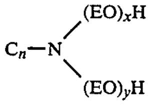 | 12 | 15 | " | 5.4 |
| 18 | | 12–14 | 25 | " | 5.7 |
| 19 | | 12–14 | 15 | " | 5.4 |
| 20 | 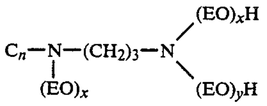 | 12–14 | 15 | " | 5.6 |
| 21 | | 16–18 | 35 | " | 7.4 |
| 22 | | 18 | 35 | " | 6.6 |
| 23 | 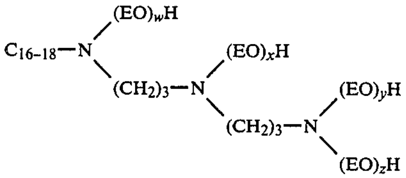 | 16–18 | 35 | Yes | 8.5 |
| 24 | 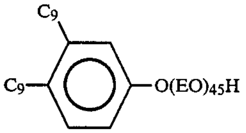 | 20 | 45 | No | — |
| 25 | 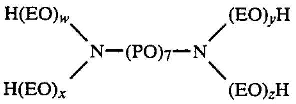 | "21" | 28 | " | — |
| 26 | $C_{12}SO_4^-Na^+$ | 12 | — | " | — |
| 27 | $[C_{12}SO_4^-][HN(EO)_3^+H]$ | 12 | — | " | — |
| 28 | $C_{14}$—$N(Me)^+Br^-$ (a) | 14 | — | Yes | 6.52 |
| 29 | NaOH (b) | — | — | " | 23.3 |
| 30 | 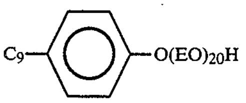 + Polyvinylpyrrolidone (mol. wt. = 38,000) | 13 | 20 | " | 11.2 |
| 31 | Polyisobutene sulphonate (mol wt = 371) | | | No | |
| 32 | Polyisobutene sulphonate (c) (mol. wt = 371) + polyvinyl pyrrolidone (mol wt 38,000) | | | Yes | 19.5 |

(a) dissolved in distilled water.
(b) dissolved in distilled water 0.08% by wt concentration
(c) 1.25% by wt concentration of each compound, giving total of 2.5%

We claim:

1. A method for the preparation of an HIPR emulsion of oil in water which method comprises directly mixing 70 to 98% by volume of a viscous oil having a viscosity in the range 200 to 250,000 mPa.s at the mixing temperature with 30 to 2% by volume of an aqueous solution of an emulsifying surfactant or an alkali, percentages being expressed as percentages by volume of the total mixture; mixing being effected under low shear conditions in the range 10 to 1,000 reciprocal seconds in such manner than an emulsion if formed comprising highly distorted oil droplets having mean droplet diameters in the range 2 to 50 micron separated by thin interfacial films.

2. A method according to claim 1 wherein the feedstock comprises 80% to 90% by volume of oil, expressed as a percentage by volume of the total mixture.

3. A method according to claim 1 wherein mixing is effected under low shear conditions in the range 50 to 250 reciprocal seconds.

4. A method according to claim 1 wherein the viscous oil has a viscosity in the range 2,000 to 250,000 mPa.s.

5. A method according to claim 1 wherein the surfactant is a non-ionic surfactant the molecules of which have a hydrocarbyl, hydrophobic group (which may be substituted) having a chain length in the range 8 to 18 carbon atoms, and one or more polyoxyethylene groups containing 9 to 100 ethylene oxide units in total, the hydrophilic group or groups containing 30 or more ethylene oxide units when the hydrophobic group has a chain length of 15 carbon atoms or greater.

6. A method according to claim 5 wherein the surfactant is an ethoxylatd alkyl phenol.

7. A method according to claim 1 wherein the surfactant is an ionic surfactant.

8. A method according to claim 7 wherein a hydrophilic polymer is employed in addition to the ionic surfactant.

9. A method according to claim 8 wherein the hydrophilic polymer is polyvinyl alcohol, polyethylene oxide, polyvinyl pyrrolidone or a polysaccharide biopolymer.

10. A method for the transportation of a viscous oil which method comprises the steps of preparing an HIPR emulsion of the oil-in-water type by a method according to claim 1, and pumping the HIPR emulsion through a pipeline.

11. A method according to claim 10 wherein the HIPR emulsion is diluted with an aqueous phase to a desired viscosity and/or concentration before being pumped through the pipeline.

* * * * *